United States Patent [19]
Kung

[11] Patent Number: 5,931,955
[45] Date of Patent: Aug. 3, 1999

[54] METHOD AND GENERIC AUTOMATIC DATABASE RECOVERY

[75] Inventor: Fen-Chung Kung, Bridgewater, N.J.

[73] Assignee: AT&T Corp, Middletown, N.J.

[21] Appl. No.: 08/990,473

[22] Filed: Dec. 15, 1997

[51] Int. Cl.[6] .................................................. G06F 11/00
[52] U.S. Cl. ............................ 714/15; 714/20; 707/202
[58] Field of Search ....................... 395/182.13, 182.14, 395/182.18; 707/202, 204, 205, 206; 711/161, 162; 714/15, 16, 20

[56] References Cited

U.S. PATENT DOCUMENTS

| | | | |
|---|---|---|---|
| 4,697,266 | 9/1987 | Finley | 371/12 |
| 4,815,028 | 3/1989 | Saitoh | 707/202 |
| 4,819,156 | 4/1989 | DeLorme et al. | 395/182.13 |
| 5,043,866 | 8/1991 | Myre, Jr. et al. | 707/202 |
| 5,280,611 | 1/1994 | Mohan et al. | 395/600 |
| 5,381,545 | 1/1995 | Baker et al. | 707/202 |
| 5,388,256 | 2/1995 | Herbert | 707/202 |
| 5,404,508 | 4/1995 | Konrad et al. | 707/202 |
| 5,530,855 | 6/1996 | Satoh et al. | 707/202 |
| 5,561,795 | 10/1996 | Sarkar | 707/202 |
| 5,720,029 | 2/1998 | Kern et al. | 395/182.18 |
| 5,734,818 | 3/1998 | Kern et al. | 395/182.18 |

*Primary Examiner*—Dieu-Minh T. Le

[57] ABSTRACT

An automated method is provided, in concert with applications programs, to recover data potentially lost in a database unavailable/crash or system failure, by use of an update transaction log that maintains current copies of any update to a system data base before any application program actually physically updates the system data base. The update transaction log is a temporary stored record of application transactions and the relevant data to be stored in the data base. The transaction log is a part of the application program and is operative whenever the application program is generating data which must be added to a relevant data base. If the database is unavailable, the external system update request can still be processed for the lagging update.

5 Claims, 2 Drawing Sheets

METHOD AND GENERIC AUTOMATIC DATABASE RECOVERY

FIELD OF THE INVENTION

This invention relates to data base recovery and in particular to restore a database lost during a data updating transaction. It is specifically concerned with an application based automated data base recovery system.

BACKGROUND OF THE INVENTION

During the performance of application programs, such as used in telephone systems, related data bases are continually updated in accord with the actions taken by the applications program. These data bases may crash or some part of the application support system may crash or fail should some trouble be encountered. In these instances, the updates to the data base cannot be completed and the data base may be corrupted. Inaccurate or incomplete data bases may adversely impact operations of application programs. It is essential that the data base integrity be maintained in the face of such failures. While recovery of data is essential, such recovery often entails delays and may result in inaccurate data being recorded.

SUMMARY OF THE INVENTION

An automated method is provided, in concert with applications programs, to recover data potentially lost in a database unavailable/crash or system failure, by use of an update transaction log that maintains current copies of any update to a system data base before any application program actually physically updates the system data base. The update transaction log is a temporary stored record of application transactions and the relevant data to be stored in the data base. The transaction log is a part of the application program and is operative whenever the application program is generating data which must be added to a relevant data base. If the database is unavailable, the external system update request can still be processed for the lagging update.

DETAILED DESCRIPTION

Figure 1:
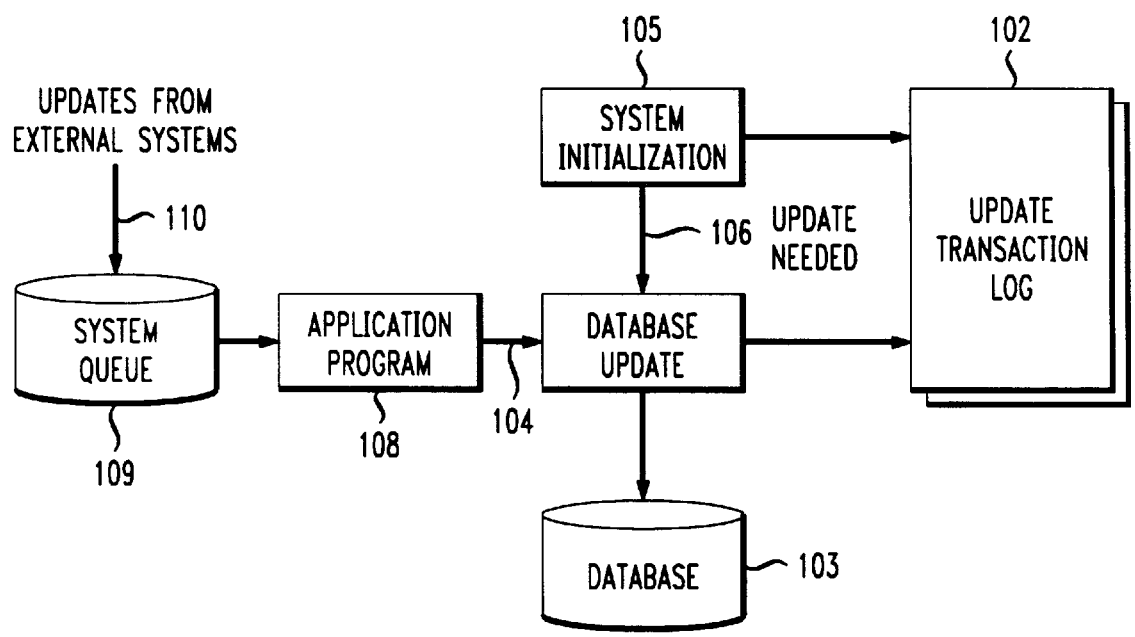
FIG. 1 is a block schematic of an overall data base updating process.

A data base recover system such as depicted in the FIG. 1 allows a data base 103 to recover from data base crashes and system failures that occur during updating of a data base by an applications program 108. A typical failure may be a system data base going out of service before an update is completed. In the described process the application program 108 receives newly arrived data update requests from system queue 109 and issues an update query 104 to update a related data base 103. During operation of the application program, the data update transaction is logged in an update transaction log 102 for subsequent recovery if needed. The application program continues to update the physical data base normally in 103 as long as no crash or failure occurs. If the update is completed, as indicated from input 104, successfully, the update transaction log 102 may be erased. If as indicated by 105 a failure or crash has occurred, resulting in a restart, system reinitialization is programmed to determine if a database recovery is needed. If such recovery is needed as indicated by line 106, a data base recovery process is enabled.

The data base update process accesses the update transaction log as indicated in 102 to perform any unfinished data base update.

If the application data base 103 fails or crashes, the external system can still send update requests to the system as indicated by connecting lead 110. In this situation, the application program 108 processes the update request and then logs the unfinished data update transaction into the update transaction log 102. When the data base 103 is operative and available the data base update process accesses the data of update transaction log 102 to perform any unfinished data updates to the data base update.

Figure 2:
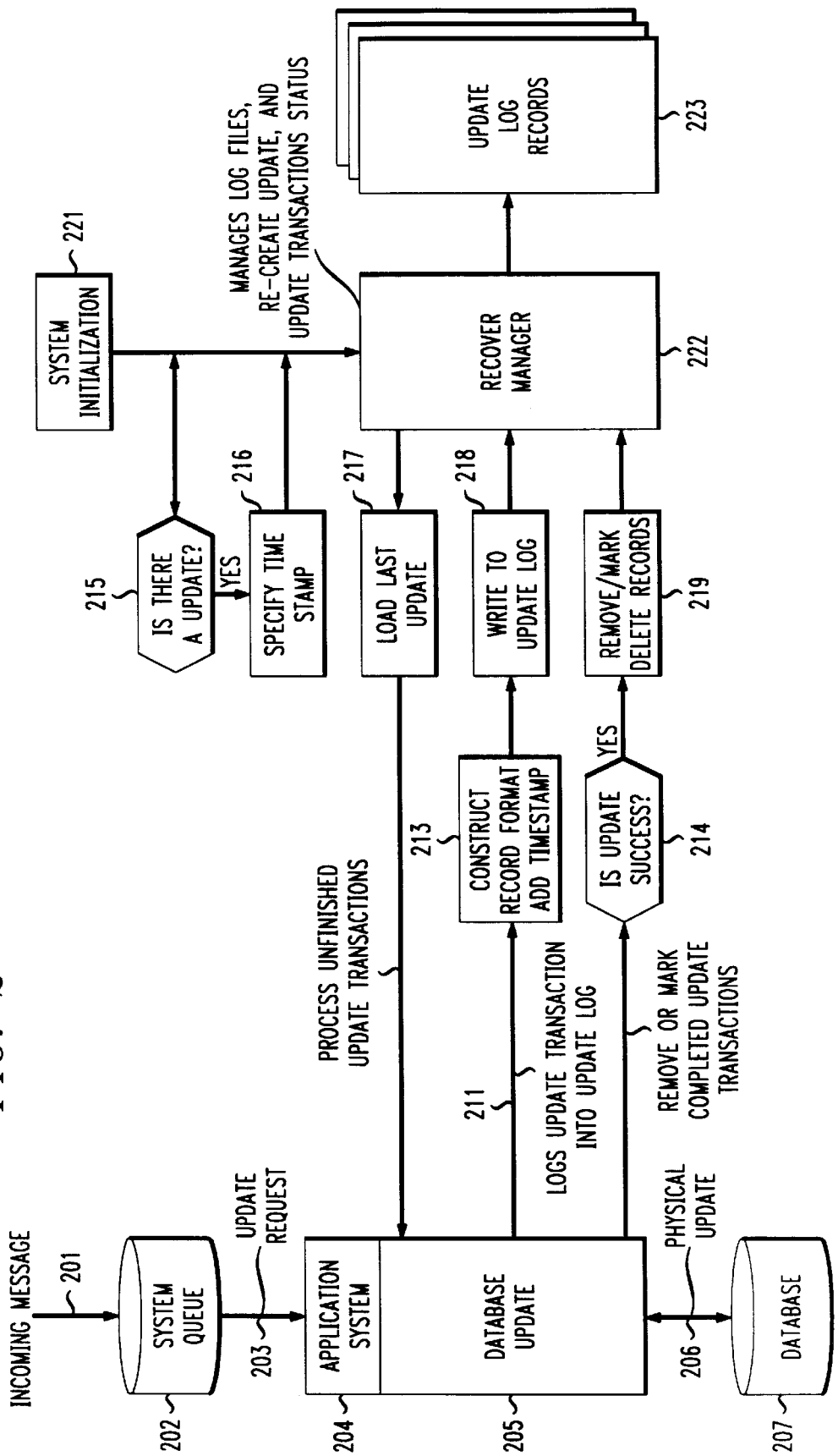
FIG. 2 is a flow chart of the process in updating databases.

The flow chart of FIG. 2 depicts both database updating processes as well as automatic recovery processes to restore lost data to the data base should a crash or system failure occur during a data base update. Initially an incoming message for reception by an application program is received at input 201 and applied to a system queue 202 which buffers the incoming message. The incoming message includes an update request to the system and is applied via lead 203 into an application system 204 which is an application program to perform some function which has a corresponding update to a system data base 207.

The application program is performed and a data update is requested as per the database update 205. In normal operation the update is directly coupled, via lead 206, to the data base 207.

Occasionally system or data base fault or crash interrupts the updating of the physical data base. To maintain the integrity of data in the data base newly added data is formatted by a construct record format update 213, via lead 211, of newly received data during normal data input. This record format construction is marked with a time stamp which indicates when any data has been added which has not been coupled to the database 207. This unentered data is coupled to a write command 218 to write the data with the time stamp to the update data log records 223 (a storage medium), via a recover manager 222, which is a software data management tool. Recover manager 222 manages log files, recreates updates and updates transaction status post the time stamp. An illustrative example of such a tool is a program that creates log files, manages the number of files, controls file size, checks file status, retrieves updated log records for a data base update, puts updated records into the log file, and updates a status of each record in the log files.

System initialization, as per box 221, is an initialization which normally follows any crash, system failure or a reset-start of the system. This occurrence sends a notification to software of the recover manage module 222 to determine a state of recovery. It interacts with a decision software module 215 to determine if there exists an update to be entered. The time stamp of an existing update is used to specify a time/date interval, in process 216, for update recovery. It does this by the system initialization process; it constructs a time and date format that can be used by the recover manager 222 to retrieve up-dated records from the log files. The recover manager 222 retrieves unfinished data entries for the appropriate time from the update log records 223. Unfinished data update transactions are loaded by module 217, as instructed by recovery manager 222, and applied to the data base update module 205. This module 205 causes a physical update of the data base 207 to occur. When the update is successfully concluded, as determined by decision module 214, a mark generated by remove/mark module 219 sends a mark, via recover manager 222, to the update log record 223 to mark the update data just used as not being available for future update transactions.

An illustrative application program which operates in conjunction with an automatic data update according to the invention is any type of telecommunications software, that receives update requests and then adds a physical update to a data base.

The invention claimed is:

1. A method of recovering data records lost during a data processing system failure during an update of data records, comprising the steps of:

initiating an application program which includes performing a database update transaction;

storing the update transaction as an update log record prior to an actual update transaction;

monitoring an actual database update transaction from the application program;

time stamping a system failure while continuing to write and store update transactions into the update log record;

re-initializing the data processing system following a failure;

determining if an active update is in process and if so, specifying a time stamp at which failure occurred;

managing an update log record to identify update data subsequent to the failure;

loading data so identified in an update database for completing the database update transaction;

determining success of the completing the database update; and removing records from the update log record.

2. The method of claim 1, comprising the further step of:

determining a system failure includes determining if a system data base is going out of service before completion of an update.

3. The method of claim 2, comprising the further step of:

accessing the transaction log to complete the data base as needed.

4. The method of claim 3, comprising the further step of:

constructing time and date formats for identifying update data subsequent to a failure.

5. The method of claim 4, comprising the further step of:

including software to control the response to a failed update following a failure of the database while still receiving incoming update requests from external systems.

* * * * *